United States Patent
Pistoia et al.

(12) 
(10) Patent No.: US 6,274,278 B1
(45) Date of Patent: Aug. 14, 2001

(54) GALLIUM DOPED LITHIUM MANGANESE OXIDE SPINELS ($LIGA_XMN_{2-X}O_4$) AS CATHODE MATERIAL FOR LITHIUM OR LITHIUM-ION RECHARGEABLE BATTERIES WITH IMPROVED CYCLING PERFORMANCE

(75) Inventors: Gianfranco Pistoia; Carlo Bellitto; Alessandra Antonini, all of Rome (IT)

(73) Assignee: Consiglio Nazionale Delle Ricerche (IT)

( * ) Notice: Subject to any disclaimer, the term of this patent is extended or adjusted under 35 U.S.C. 154(b) by 0 days.

(21) Appl. No.: 09/155,592

(22) PCT Filed: Mar. 5, 1997

(86) PCT No.: PCT/IT97/00048

§ 371 Date: Mar. 9, 1999

§ 102(e) Date: Mar. 9, 1999

(87) PCT Pub. No.: WO97/37394

PCT Pub. Date: Oct. 9, 1997

(30) Foreign Application Priority Data

Mar. 29, 1996 (IT) .............................................. RM96A0200

(51) Int. Cl.[7] .............................. H01M 6/18; H01M 4/50
(52) U.S. Cl. ....................... 429/322; 429/224; 429/231.1; 429/231.95
(58) Field of Search ................................ 429/224, 231.1, 429/231.95, 322

(56) References Cited

U.S. PATENT DOCUMENTS 4,396,690 * 8/1983 Gordon et al. ........................ 429/111
4,507,371 * 3/1985 Thackeray et al. ................... 429/191

(List continued on next page.)

FOREIGN PATENT DOCUMENTS 0682377  11/1995  (EP) .
0690520  1/1996   (EP) .

(List continued on next page.)

OTHER PUBLICATIONS

*Patent Abstracts of Japan*, vol. 018, No. 290 (E–1557), Jun. 2, 1994 & JP 06 060879 A (Nippondenso Co., Ltd.), Apr. 3, 1994.

*Patent Abstracts of Japan*, vol. 013, No. 044 (E–710), Jan. 31, 1989 & JP 63 239781 A (Nippon Telgr. & Teleph. Corp.), May 10, 1988.

(List continued on next page.)

*Primary Examiner*—Tom Dunn
*Assistant Examiner*—Kiley Stoner
(74) *Attorney, Agent, or Firm*—Smith, Gambrell & Russell, LLP

(57) ABSTRACT

An improved process for preparing a spinel type lithium manganese composite oxide represented by the general formula (I): $Li_x Mn_{(2-y)} M_{y1} B_{y2} O_4$ wherein M represents at least one member selected form among Al, Cr, Fe, Ni, Co, Ga, and Mg; $0.9 \leq x \leq 1.1$; and $y=y_1+y_2$, wherein $0.002 \leq y \leq 0.5$, $0 \leq y_1 \leq 0.5$, and $0.002 \leq y_2 \leq 0.1$ or represented by the general formula (Ia) $Li_x Mn_{(2-y)} M_y O_4$, which is the same as the general formula (I) except that $y_2$ is 0. In formula (Ia) M and x are each as defined above and $0.002 \leq y \leq 0.5$; and a cathode active material for a lithium ion rechargeable battery comprising the spinel type lithium manganese composite oxide having improved charge-discharge characteristics produce by the above method. The composite oxide thus produce is a novel one improved in cycle characterized, particularly in charge-discharge cycle characterized in a high-temperature (50° C. or above) environment, and hence is very useful form the viewpoint of industry.

25 Claims, 1 Drawing Sheet

| | | | |
|---|---|---|---|
| 5,169,736 | | 12/1992 | Bittihn et al. . |
| 5,368,958 | | 11/1994 | Hirai et al. . |
| 5,618,640 | * | 4/1997 | Idota et al. .......................... 429/194 |
| 5,683,835 | * | 11/1997 | Bruce ................................. 429/224 |
| 5,693,307 | * | 12/1997 | Bowden et al. ..................... 423/599 |
| 5,721,067 | * | 2/1998 | Jacobs et al. ......................... 429/60 |
| 5,750,288 | * | 5/1998 | Xie et al. ............................ 429/229 |
| 5,759,719 | * | 6/1998 | Mao .................................... 429/223 |
| 5,939,043 | * | 8/1999 | Yahagi ................................ 423/599 |
| 6,022,640 | * | 2/2000 | Takada et al. ................. 429/231.95 |
| 6,033,343 | * | 3/2000 | Licht .................................. 479/221 |
| 6,040,089 | * | 3/2000 | Manev et al. .................... 429/231.1 |
| 6,083,644 | * | 7/2000 | Watanabe et al. ............... 429/231.1 |
| 6,153,333 | * | 11/2000 | Barker ............................... 429/218.1 |
| 6,165,646 | * | 12/2000 | Takada et al. ...................... 429/322 |

FOREIGN PATENT DOCUMENTS

| | | | |
|---|---|---|---|
| 06060879 | * | 4/1994 | (JP) . |
| WO97/37394 | * | 10/1997 | (WO) . |
| WO98/50308 | * | 12/1998 | (WO) . |

OTHER PUBLICATIONS

*Database Inspec. Institute of Electrical Engineers, Stevenage, GB*, Inspec. No. 4742858, Gummow, R.J., et al.: "Improved Capacity Retention in Rechargeable 4V Lithium/ Lithium–Manganese Oxide (Spinel) Cells" XP002030874 & *Solid State Ionics, Diffusion & Reactions*, 4/94, Netherlands, vol. 69, No. 1, ISSN 0167–2738, pp. 59–67.

* cited by examiner

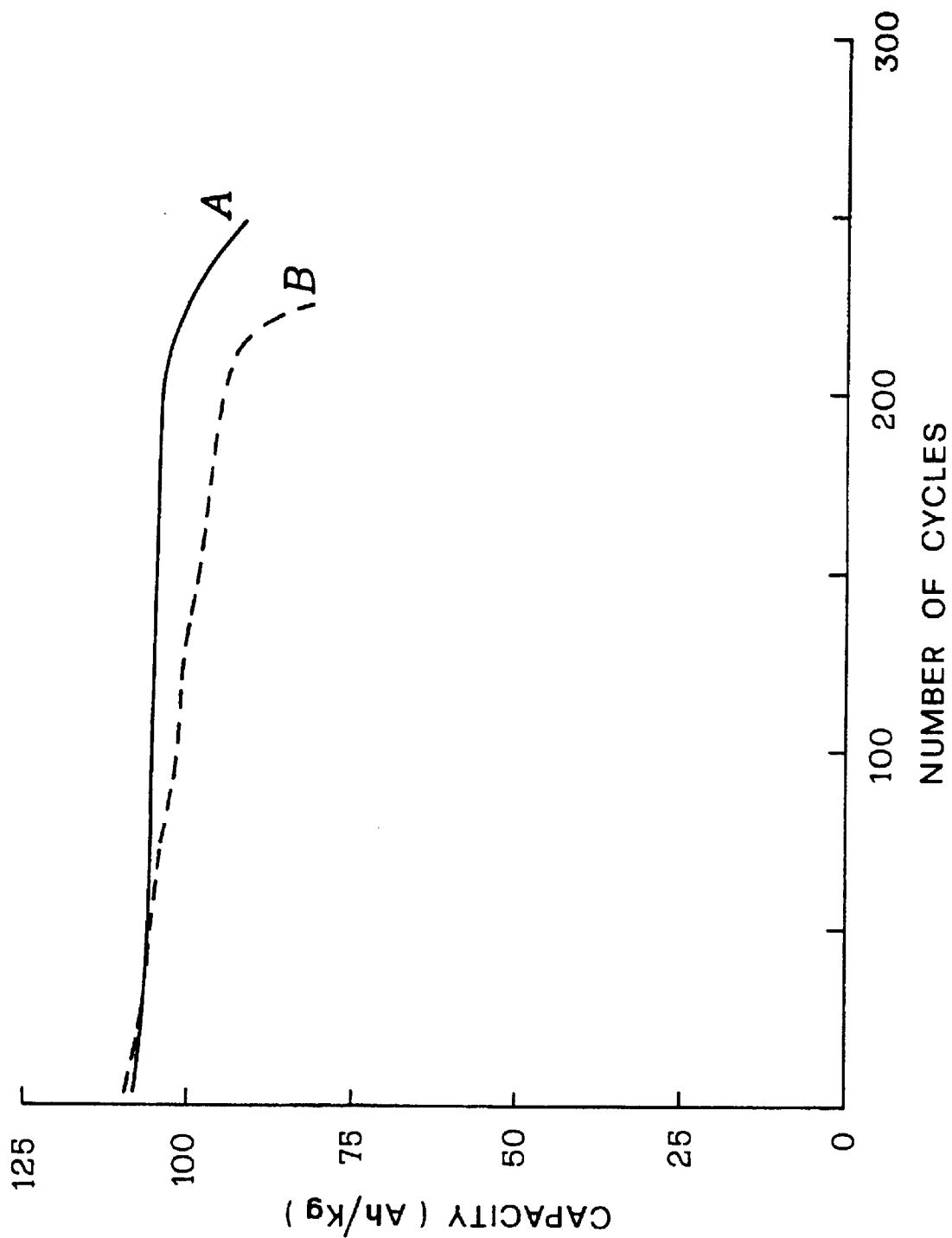

GALLIUM DOPED LITHIUM MANGANESE OXIDE SPINELS (LIGA$_x$MN$_{2-x}$O$_4$) AS CATHODE MATERIAL FOR LITHIUM OR LITHIUM-ION RECHARGEABLE BATTERIES WITH IMPROVED CYCLING PERFORMANCE

SPECIFICATION

The present invention concerns a lithium or lithium-ion rechargeable battery with improved cycling performance. More specifically, the invention relates to a kind of high energy density secondary cell which can be employed in several fields, in place of conventional rechargeable batteries such as lead acid and nickelcadmium batteries. Said secondary cell is based on the use of a lithium anode or of an anode capable of intercalating lithium ions, in combination with a non-aqueous electrolyte system, and of a cathode material whose nature is the specific subject of this invention.

Lithium batteries, which have been developed quite recently and are on the market since a relatively short time, have attracted much attention in view of the high levels of voltage and energy that they can offer in a quite reduced volume. This makes lithium batteries particularly promising for use in the field of consumer electronics (such as cellular telephones, camcorders, portable computers), in fixed appliances (such as telephone exchanges, alarm systems) or for various kinds of electrical vehicles.

All of the devices mentioned above require batteries endowed, in particular, with the following properties: high values of specific energy (normally measured in watt-hour/kg) and of specific power (watt/kg), a good cyclability (from about 200 to about 1500 cycles, depending on the kind of application), low cost, high safety. Moreover, it is highly desirable that, as cycling progresses, the energy supplied by the battery decrease in a limited way. In other words, the battery capacity (currently expressed in ampere-hour) should not show substantial losses with time.

According to the current state of the art, the anode element of a lithium secondary cell is made of lithium metal, alone or in alloy with other metals, while the anode of a lithium-ion secondary cell is made of an electrically conductive material, e.g. a carbonaceous material, wherein lithium is intercalated in ionic form. The latter type of cell is also called "rockingchair" cell or "swing system" cell, with reference to the oscillating rhythm with which lithium is removed from the anode intercalation compound for being intercalated in the cathode material in the discharge phase, and vice-versa in the charge phase.

As far as the cathode material is concerned, several compounds consisting of lithium oxides and transition metals have been studied so far. Among these materials LiCoO$_2$ and LiNiO$_2$ may be cited (originally disclosed in U.S. Pat. No. 4,302,518), as well as the manganese spinel LiMn$_2$O$_4$ (identified in U.S. Pat. No. 4,312,930 as a lithium intercalation compound, from which lithium may be removed by acid treatment without altering the crystalline structure thereof). In many of these materials remarkable amounts of lithium may be reversibly intercalated. For instance, is has been reported that both LiCoO$_2$ and LiNiO$_2$ may deliver more than 140 Ah/kg by reversibly inserting lithium (Ohzuku et al., Chemistry Express, 7, 193 (1992)).

As a matter of fact, all of the cathode materials referred to above are characterised by capacities which decrease as the number of cycles undergone by the battery increases.

Theoretical studies carried out in this respect appear to agree on the hypothesis that this behaviour is due to changes in the structure of the concerned materials when the lithium ions are insertedlextracted intfrom said structures.

The manganese spinel, LiMn$_2$O$_4$, is considered to be the most attractive cathode material for practical applications, in view of some advantageous features thereof, such as low cost, reduced pollution potential, high voltage and high power. However, said material is characterised by a limited specific capacity (110–120 Ah/kg), which, in addition, tends to decease with cycling. For instance, Tarascon et al. (J. M. Tarascon, E. Wang, F. K Shokoohi, W. R. McKinnon, and S. Colson, J. Electrochem. Soc., 18 No. 10, 2859–2864, 1991) have found that secondary lithium cells with LiMn$_2$O$_4$ cathode working at an average voltage of 4.1 V with theoretical values of specific energy of 480 Wh/kg lose about 10% of their initial capacity over 50 cycles.

In order to limit the capacity loss with cycling, it has been proposed to replace part of the manganese with other metals such as Zn, Mg, Co, Ni, Cu and Fe. For instance, EP-A-0 390 185 (Matsushita) proposes a non-aqueous electrolyte secondary battery with lithium anode wherein the cathode material may be represented by the following formula:

wherein
M=Co, Cr or Fe
$0.02 \leq y \leq 0.3$
$0.85 \leq x \leq 1.15$.

According to said document, materials of the kind of the manganese spinel wherein a portion of manganese is replaced by cobalt, chromium or iron have reduced lattice constants with respect to the starting spinel, and this would result in an increased stability of the resulting crystal structure. Said enhanced stability would cause a better ability to undergo a high number of charge and discharge cycles without great losses in the performance.

On the other hand, Tarascon et al. (J. Electrochem. Soc., loc. cit.) report, as a result of their studies on manganese spinels of the formula LiM$_y$Mn$_{(2-y)}$O$_4$ wherein small amounts of manganese are replaced by M=Ti, Ge, Zn, Ni or Fe, that the introduction of cations of valence 2 (such as zinc and nickel), or 3 (such as iron) reduces the capacity of the cells at 4.1 V, but does not result in any enhancement of their cycling performance.

According to Gummow et al. (R. J. Gummow, A. de Kock and M. M. Thackeray, Solid State Ionics, 69, 5967, 1994) the replacement of a portion of manganese as proposed by the cited EP-A-0 390 185 and by Tarascon et al. (loc. cit.) did not lead to any significant increase in the cell capacity at 4 V. In order to obtain batteries of this kind which offer a better constancy in the capacity with cyding, Gummow et al. propose to dope the LiMn$_2$O$_4$ spinel with small amounts of monovalent or multivalent cations. Said cations are added in such proportions as to increase the average oxidation state of manganese in the spinel slightly above the normal value of +3.5 (in LiMn$_2$O$_4$ one of the two Mn ions has oxidation state +3, while the other has oxidation state +4). Thus, the document proposes the use of a manganese spinel wherein a portion of manganese is substituted by lithium, according to the formula

wherein $0 \leq \delta \leq 0.33$
or it is substituted by bivalent metal cations, such as Mg$^{2+}$ or Zn$^{2+}$ (so as to result in a non-stoichiometric spinel, with a slight cation deficiency) according to the general formula $LiM_{\delta/2}Mn_{(2-\delta)}O_4$ with $0 \leq 5 \leq 0.1$.

Accordingly, the document U.S. Pat. No. 5,316,877, of the same research group, generalises the above concept and proposes cathode materials for lithium rechargeable batteries having a structure of the spinel type and the following general formula:

$Li_1D_{x/b}Mn_{2-x}O_{4+\delta}$ wherein:

$0 \leq x \leq 0.33$ and $0 \leq 5 \leq 0.5$ with x and 5 such that the oxidation state N of the manganese cation is $3.5 \leq N \leq 4$;

D is a mono- or multivalent metal cation; and b is the oxidation state of D.

As examples of cations different from the lithium ion, the document mentions the $Mg^{2+}$ ion for which the above formula reads $Li_1Mg_{x/2}Mn_{2-x}O_{4+\delta}$, and the $Co^{3+}$ ion, for which the above formula reads $Li_1Co_{x/3}Mn_{2-x}O_{4+\delta}$.

According to what set forth both in the latter US patent document and in the previously cited article, with the cathode materials based on modified manganese spinel according to the above formulae specific capacities have been obtained which remain constant for at least 20 cycles, differently from what happens with conventional manganese spinel. However, a reduction of the initial capacity has been obtained at the same time, from 110–120 Ah/kg (normal values for $LiMn_2O_4$) to about 100 Ah/kg average.

The foregoing is also confirmed in a later publication of one of the authors of the previous works (M. M. Thackeray, J. Electrochem. Soc., 142, No. 8, 2558–2563,1995).

Therefore, it is an object of the present invention to provide a cathode material for 4 V secondary lithium or lithium-ion batteries which is derived from the $LiMn_2O_4$ spinel, wherein a portion of manganese is replaced by an element having the effect of maintaining the battery capacity sufficiently constant during the cycling, but without causing any significant initial loss in said capacity.

To this aim there is proposed to employ a manganese spinel wherein a limited amount of manganese is replaced by an equal amount of a specific metal of Group III of the Periodic Table of Elements, i.e. gallium. The cathode material proposed may thus be represented by the formula: $LiGa_xMn_{2-x}O_4$, wherein x does not go above the value of 0.1. The best results have been obtained with moderate substitutions of Ga for Mn, for instance for x=0.05. In this way, many of the spinel properties, such as, in particular, the low cost and the low toxicity, remain unchanged, while at the same time the performance of the cathode material improves, since the initial capacity of the spinel is maintained more constant with cycling.

A galliumoped manganese spinel cathode material is reported in JP-A-06 060879 (patent Abstracts of Japan Vol. 18, No. 290—E1557), as being obtained by mixing $LiOH.H_2O$, γ-$MnO_2$ and $Ga_2O_3$ in a molar ratio of Li:Mn:Ga=1:1.98:0.02, heating the mixture at 470° C. for 3 hours and then rapidly cooling the mixture by immerging it in extremely cold water (quenching). Such a synthesis process affords a cathode material with nominal formula $LiGa_{0.02}Mn_{1.99}O_4$, which actually has an oxygen content higher than 4 atoms/molecule, and a low degree of crystallinity, whose specific capacity is not suitable for a use of the material in a 4 V rechargeable battery. From the specific choice of the spinel synthesis conditions, it appears that the Ga-doped manganese spinel disclosed is intended for use as cathode material in a rechargeable lithium battery working at 3 V. On the other hand, the present invention specifically provides a lithium or lithium-ion rechargeable battery with improved cycling performance, comprising an anode made of lithium optionally alloyed with other metals, or an anode made of an electrically conductive material wherein lithium is intercalated in ionic form, a non-aqueous electrolyte and a cathode based on a manganese spinel modified by the substitution of a portion of manganese with an equal amount of gallium, according to the following formula:

$LiGa_xMn_{2-x}O_4$ wherein: $0 \leq x \leq 0.1$
characterised in that said rechargeable battery has a nominal voltage of 4 V, and in that said modified manganese spinel is obtainable by mixing together LIOH, $MnO_2$ and a gallium compound such as $Ga_2O_3$, by heating the mixture to a temperature from 650° C. to 850° C. and by keeping the said mixture to such temperature for 2–3 days.

Thus, the cathode material according to the invention may be produced by carrying out the spinel synthesis in the presence of a gallium compound (such as, e.g., $Ga_2O_3$), according to a reaction scheme that may be summarised as follows:

$LIOH + x/2\, Ga_2O_3 + (2-x)MnO_2 \rightarrow LiGa_xMn_{2-x}O_4 + \frac{1}{2}H_2O + (1-x)/4 O_2$ The synthesis procedure is quite similar to the procedure for obtaining the conventional manganese spinetl $LiMn_2O_4$. The starting products, for instance LiOH, $Ga_2O_3$ e $MnO_2$, are thoroughly mixed together to give a homogeneous powder. Then, the mixture is heated to a temperature from 650° C. to 850° C. (preferably 700–750° C.), and is kept to such temperature for 2–3 days. A black powder is thus obtained, non toxic and non hygroscopic, which may be easily manipulated to form the electrode for use in the battery according to the invention.

From the point of view of the crystal structure, it is to be noted that the variation brought in by the introduction of gallium in the starting spinel is quite limited. This is believed to be due to the similarity of the ionic radius of $Mn^{+3}$ and $Ga^{+3}$: 0.65 Å and 0.62 Å, respectively. As a matter of fact, it has been ascertained by X-ray diffractometry that the original spinel has a cubic symmetry characterised by a value of the lattice parameter a=8.227 Å (for a synthesis temperature of 700–750° C.), and that the a parameter of the compounds of the formula $LiGa_xMn_{2-x}O_4$ is quite similar.

In order to explain why the gallium-containing spinel has a better electrochemical behaviour than the spinel with no gallium, some hypotheses may be made, based on the knowledge of the structural variations caused by the lithium ion in the spinel structure when the battery is cycled. During the initial charge of the cell (which is assembled in the discharged state), lithium ion is extracted from the spinel structure, and during the removal of $Li^+$ the Mn ion having oxidation state +3 is oxidised to $Mn^{+4}$. During the subsequent discharge, the $Mn^{+4}$ ion so formed in the charge phase is again reduced to $Mn^{+3}$. The latter has, as pointed out above, a radius of 0.65 Å, while the radius of $Mn^{+4}$ is 0.53 Å. In the final period of the discharge phase the existence, in some regions of the cathode material, of a ratio $Mn^{+3}/Mn^{+4} > 1$ may give rise to the so-called Jahn-Teller effect: owing to the difference in the ionic radiuses of $Mn^{+3}$ e $Mn^{+4}$, the structure becomes distorted and acquires a tetragonal symmetry derived from the original cubic symmetry. It is generally acknowledged by the persons skilled in the field that this structural variation has detrimental effects on the maintenance of the initial capacity during the charge/discharge cycles.

By contrast, the $Ga^{+3}$ ion, by replacing part of the $Mn^{+3}$ ion, limits the possibility that the $Mn^{+3}/Mn^{+4}$ ratio exceeds the value 1. This function could also be carried out by other ions, such as those that have already been studied in the prior art cited in the foregoing. However, some of the said ions may involve problems, either due to a ionic radius too different from that of $Mn^{+3}$ (for instance, $Fe^{+2}$: 0.78 Å) or to the fact that said ions may show, in turn, the Jahn-Teller effect (for instance, $Cu^{+2/+1}$ o $Ni^{+4/+3}$). For other ions, such as $Mg^{2+}$ and $Zn^{2+}$, as pointed out before, the stability to cycling is achieved at the expense of the capacity, owing to the quantitative ratios employed.

In a preferred embodiment of the invention the amount of gallium which is substituted to manganese is such that x has the value 0.05, and the formula of the resulting cathode material is $LiGa_{0.05}Mn_{1.95}O_4$.

As usual, the cathode material according to the invention is mixed with electrically conductive additives, such as, for instance, carbonblack or graphite, in an amount equal to 5–20% by weight, based on the total weight of the mixture. Binding agents are also added, such as, for instance, polyethylene, polytetrafluoroethylene, polyvinylidene difluoride, ter-monomer ethylene propylene diene, in an amount equal to 3–10% by weight, based on the total weight of the mixture. This composite powder is compressed, at 3–10 tons/cm$^2$, on a metal support (stainless steel or aluminium, in leaf or net form) to form the electrode.

As far as the anode material is concerned, in lithium batteries the anode may be made of lithium metal, alone or in alloy with other metals, while in lithium-ion batteries the anode is often made of a carbonaceous material capable of intercalating lithium ions during the charge and of releasing again said ions during the discharge. Said material is preferably partially or totally graphitised carbon.

The electrolyte may be made of a liquid solution obtained by dissolving a lithium salt (for instance: $LiPF_6$, $LiBF_4$, $LiClO_4$, $LiAsF_6$) in an organic solvent or in a mixture of organic solvents (for instance: ethylene carbonate, propylene carbonate, dimethyl carbonate, diethyl carbonate, methyl formate, methyl acetate). The solution is absorbed in the pores of a separator, e.g. made of glass wool or of polyethylene.

As an alternative, the electrolyte may be solid, and, specifically, it may be a ion-conductive polymer of the kind of $LiClO_4$-polyethylene oxide, or a polymer matrix (e.g., polyacrylonitrile, polyvinyl chloride, polymethyl methacrylate) soaked with a liquid electrolyte of the kind referred to above.

The battery may assume quite different shapes, ranging from a small button battery to a large parallelepipedal battery. In general, the shape may be chosen from the following group: button, cylindrical, prismatic and flat ultra-thin battery. In a preferred embodiment of the invention, the battery is cylindrical, and is produced by supporting the anode material on a copper band and the cathode material on an aluminium band, and by placing between the two said bands a separator band soaked with electrolyte (or, alternatively, a band made of a polymer electrolyte). Said bands, wound together so as to form a spiral, are placed into a stainless steel cylindrical container.

Within the frame of the research that lead to the present invention, two other elements have been studied, i.e. aluminium and boron, which belong to the same group of the Periodical Table of Elements as gallium. However, the performance as cathode materials of manganese spinels wherein part of the Mn is replaced by Al o B turned out to be unsatisfactory. In particular, the specific capacities in the case of boron-substituted spinels are considerably lower than those offered by the usual $LiMn_2O_4$, and decrease with the number of cycles undergone by the battery. The behaviour of aluminium as substitutive element is better, but the initial specific capacities obtainable are still lower than 100 Ah/kg.

If it is considered that the ionic radiuses are 0.54 Å for $Al^{+3}$ and 0.27 Å for $B^{+3}$, it may be understood that said poor performances are to be ascribed to the structural stresses originated from the reduced size of the substitutive ions with respect to $Mn^{+3}$ (which, as pointed out before, has a ionic radius of 0.62 Å).

The results of some experiments carried out on a rechargeable battery of the invention, constructed in accordance with the preferred solutions referred to in the foregoing, as well as some comparative tests, are discussed by way of example below. The same results are also illustrated in the accompanying drawing.

In order to directly compare the performance of the rechargeable battery according to the invention with the performance of a similar battery having a $LiMn_2O_4$ cathode, the latter has been prepared by the same procedure disclosed above for the production of the $LiGa_xMn_{2-x}O_4$ cathode. As a matter of fact, the two materials have the same morphological features, and they are both formed by porous particles having a diameter of 10–20 $\mu$m and a surface area of 3–6 m$^2$/g.

For comparison purposes, button cells were produced starting from both cathode materials. Each series of cells had a lithium anode, a liquid electrolyte ($LiPF_6$ in ethylene carbonate and dimethyl carbonate), a cathode supported on aluminium net and containing a total amount of 20% by weight of carbon black and polytetrafluoroethyene. The charge/discharge conditions were the following: 1 mA/cm$^2$ (85 mA/g) between 3.5 and 4.3 V.

The results of the comparison are illustrated in the enclosed figure, which shows the behaviour of the specific capacity (in Ah/kg) as the number of charge/discharge cycles increases. In the said figure, the A curve concerns the battery with $LiGa_{0.05}Mn_{1.95}O_4$ as the cathode material, while the B curve concerns the battery with $LiMn_2O_4$ as the cathode material. As it is evident from the graph, the capacity retention is better in the battery according to the present invention, and this better performance does not involve any loss in the initial specific capacity. The latter has practically the same value typical of the conventional spinel.

Even in the absence of optimisation procedures, which are possible mainly at the industrial development stage, the battery with $LiGa_{0.05}Mn_{1.95}O_4$ underwent about 230 cycles with a capacity loss of ~10%. By contrast, in the same conditions, the battery with $LiMn_2O_4$ has shown a capacity loss of ~25%, while the initial capacities of the two cathodes were almost the same (about 110 Ah/kg, in the example reported). The capacity loss observed after ~250 cycles is due to the exhaustion of the lithium anode. The latter, as it is known, has a limited cycle life due to corrosion phenomena. The replacement of the lithium anode with a carbonaceous anode may extend the cycle life to above 1000 cycles.

The present invention has been disclosed by particular reference to some specific embodiments thereof, but it should be understood that modifications and changes may be made by the persons skilled in the art without departing from the scope of the invention as defined in the appended claims.

What is claimed is:

1. A lithium or lithium-ion rechargeable battery with improved cycling performance, comprising an anode made of lithium optionally alloyed with other metals, or an anode of an electrically conductive material wherein lithium is intercalated in ionic form, a non-aqueous electrolyte and a cathode based on a manganese spinel modified by the substitution of a portion of manganese with an equal amount of gallium, according to the following formula:

$$LiGa_xMn_{2-x}O_4$$

wherein: $0 < x \leq 0.1$
characterized in that said rechargeable battery has a nominal voltage of 4 V, and in that said modified manganese spinel is obtained by mixing together LIOH, $MnO_2$ and a gallium compound, and heating the mixture to a temperature from 650° C. to 850° C.

2. A rechargeable battery according to claim 1, having a shape chosen from the group consisting of: button battery, cylindrical battery, prismatic battery and flat ultra-thin battery.

3. A rechargeable battery according to claim 1, wherein the anode is placed on a copper support and the cathode is placed on an aluminum support.

4. A rechargeable battery according to claim 1, wherein said cathode includes an electrically conductive additive selected from the group consisting of graphite and carbon-black.

5. A rechargeable battery according to claim 1, wherein said cathode includes a binding agent selected from the group consisting of polyethylene, polytetrafluoroethylene, polyvinylidine difluoride, and ter-monomer ethylene propylene diene.

6. A rechargeable battery according to claim 1 wherein x is 0.05.

7. A rechargeable battery according to claim 6, wherein said cathode includes one or more electrically conductive additives.

8. A rechargeable battery according to claim 6, wherein said cathode includes one or more binding agents.

9. A rechargeable battery according to claim 6, wherein said cathode includes an electrically conductive additive selected from the group consisting of graphite and carbon-black.

10. A rechargeable battery according to claim 6, wherein said cathode includes a binding agent selected from the group consisting of polyethytene, polytetrafluoroethylene, polyvinylidine difluoride, and ter-monomer ethylene propylene diene.

11. A rechargeable battery according to claim 1, wherein said cathode includes one or more electrically conductive additives.

12. A rechargeable battery according to claim 11, wherein said one or more conductive additives are present in an amount equal to 5% to 20% by weight, based on total weight of the cathode mixture.

13. A rechargeable battery according to claim 11, wherein said cathode includes one or more binding agents.

14. A rechargeable battery according to claim 11, wherein said cathode includes a binding agent selected from the group consisting of polyethylene, polytetrafluoroethylene, polyvinylidine difluoride, and ter-monomer ethylene propylene diene.

15. A rechargeable battery according to claim 1, wherein said cathode includes one or more binding agents.

16. A rechargeable battery according to claim 15, wherein said one or more binding agents are present in an amount equal to 3% to 10% by weight, based on total weight of the cathode mixture.

17. A rechargeable battery according to claim 1, wherein said electrically conductive material forming the anode is partially or totally graphitized carbon.

18. A rechargeable battery according to claim 1, wherein said non-aqueous electrolyte is a liquid.

19. A rechargeable battery according to claim 18, wherein said electrolyte consists of a liquid solution obtained by dissolving a lithium salt in an organic solvent or in a mixture of organic solvents.

20. A rechargeable battery according to claim 19, wherein said lithium salt is chosen from the group consisting of $LiPF_6$, $LiBF_4$, $LiClO_4$, and $LiAsF_6$.

21. A rechargeable battery according to claim 19, wherein said organic solvent or said mixture of organic solvents includes a solvent chosen from the group consisting of ethylene carbonate, propylene carbonate, dimethyl carbonate, diethyl carbonate, methyl formate, and methyl acetate.

22. A rechargeable battery according to claim 1, wherein said non-aqueous electrolyte is a solid.

23. A rechargeable battery according to claim 22, wherein said electrolyte is polymeric, and consists of a $LiClO_4$-polyethylene oxide complex.

24. A rechargeable battery according to claim 22, wherein said solid electrolyte consists of a polymer matrix soaked with a liquid electrolyte.

25. A rechargeable battery according to claim 24, wherein said polymer matrix is chosen from the group consisting of polyacrylonitirle, polyvinyl chloride, and polymethyl methacrylate.

* * * * *